United States Patent
Hildebrandt et al.

(10) Patent No.: US 9,516,499 B2
(45) Date of Patent: Dec. 6, 2016

(54) PROTECTION FOR A MEANS OF TRANSPORTATION AGAINST UNAUTHORISED USAGE OR THEFT

(71) Applicant: VODAFONE GMBH, Duesseldorf (DE)

(72) Inventors: Maik Hildebrandt, Gelsenkirchen (DE); Robin Friedrich, Haltern am See (DE)

(73) Assignee: VODAFONE GMBH, Dusseldorf (DE)

( * ) Notice: Subject to any disclaimer, the term of this patent is extended or adjusted under 35 U.S.C. 154(b) by 0 days.

(21) Appl. No.: 14/507,963

(22) Filed: Oct. 7, 2014

(65) Prior Publication Data

US 2015/0139423 A1    May 21, 2015

(30) Foreign Application Priority Data

Oct. 7, 2013    (DE) .................... 10 2013 111 087

(51) Int. Cl.
| | |
|---|---|
| G06F 7/04 | (2006.01) |
| G06F 17/30 | (2006.01) |
| H04N 7/16 | (2011.01) |
| H04W 12/04 | (2009.01) |
| B62H 5/00 | (2006.01) |
| H04W 12/06 | (2009.01) |
| H04L 9/32 | (2006.01) |
| H04W 8/26 | (2009.01) |

(Continued)

(52) U.S. Cl.
CPC ............. *H04W 12/04* (2013.01); *B62H 5/00* (2013.01); *B62H 5/20* (2013.01); *G07C 9/00309* (2013.01); *G07C 9/00571* (2013.01); *H04L 9/3242* (2013.01); *H04W 8/26* (2013.01); *H04W 12/06* (2013.01); *G07C 2009/0092* (2013.01); *G07C 2009/00412* (2013.01); *H04L 2209/24* (2013.01); *H04L 2209/80* (2013.01); *H04W 4/14* (2013.01); *H04W 12/12* (2013.01)

(58) Field of Classification Search
CPC .................................................. H04L 2209/80
USPC ........................................................... 726/28
See application file for complete search history.

(56) References Cited

U.S. PATENT DOCUMENTS

| | | | |
|---|---|---|---|
| 6,081,199 A | 6/2000 | Hogl | |
| 8,943,187 B1 * | 1/2015 | Saylor | ............... H04L 67/306 709/223 |

(Continued)

FOREIGN PATENT DOCUMENTS

| | | |
|---|---|---|
| DE | 19528203 | 10/1996 |
| DE | 10137579 | 2/2003 |
| DE | 10336567 | 3/2005 |

OTHER PUBLICATIONS

Manjunath T K; Locking and Unlocking of Theft Vehicles Using CAN; Year: 2003; IEEE; p. 1-7.*

*Primary Examiner* — Monjour Rahim
(74) *Attorney, Agent, or Firm* — Grossman, Tucker, Perreault & Pfleger, PLLC (57) ABSTRACT

The present invention relates to a method for protection of a means of transportation against unauthorized usage or theft using a lock and an end device that can be operated in a cellular network. Subject of the invention are further a lock for protection of a means of transportation against unauthorized usage or theft as well as a end device that can be operated in a cellular network, that are particularly designed to carry out process steps of the inventive method which need to be carried out by the lock respectively the end device.

16 Claims, 3 Drawing Sheets

(51) Int. Cl.
*B62H 5/20* (2006.01)
*G07C 9/00* (2006.01)
*H04W 4/14* (2009.01)
*H04W 12/12* (2009.01)

(56) References Cited

U.S. PATENT DOCUMENTS

| | | | | |
|---|---|---|---|---|
| 2001/0021977 | A1* | 9/2001 | Liden | G07C 9/00309 713/170 |
| 2002/0180582 | A1* | 12/2002 | Nielsen | G07C 9/00103 340/5.6 |
| 2009/0183541 | A1* | 7/2009 | Sadighi | G07C 9/00103 70/263 |
| 2011/0285509 | A1* | 11/2011 | Greene | G06Q 10/00 340/10.1 |
| 2014/0000322 | A1* | 1/2014 | Williams | E05B 73/0011 70/18 |
| 2015/0221152 | A1* | 8/2015 | Andersen | G07C 9/00309 340/5.22 |

* cited by examiner

PROTECTION FOR A MEANS OF TRANSPORTATION AGAINST UNAUTHORISED USAGE OR THEFT

CROSS REFERENCE TO RELATED APPLICATIONS

This application claims priority to German Patent Application No. 10 2013 111 087.9 filed on Oct. 7, 2013, the disclosure of which is incorporated by reference herein in its entirety.

FIELD OF THE INVENTION

The present invention relates to a method for protection for a means of transportation against unauthorised usage or theft using a lock and an end device that can be operated in a cellular network.

The invention further comprises a lock to secure a means of transportation against unauthorised usage or theft as well as an end device designed to be operated in a cellular network to protect a means of transportation against an unauthorised usage or theft, which is particularly designed to carry out process steps of the inventive method which have to be executed by the lock, respectively by the end device.

BACKGROUND

From DE 101 37 579 A1 it is known particularly for applications in the field of rental to protect a bicycle with an electronic code lock, which is opened with an opening code and closed with a closing code. The opening code of the code lock required for the usage of the bicycle respectively the required closing code for closing the code lock is provided to a user via his mobile phone, after the user has contacted a service centre with his mobile phone and requested the opening code respectively the closing code.

The service centre which is required for supply of the opening code respectively the closing code of the code lock is particularly provided due to billing reasons for the rental of a bicycle and requires a certain effort in terms of personnel and resources, which prevent a private usage to secure a means of transportation, particularly a bicycle, against unauthorised access or theft. Furthermore, when a means for protection of a transportation means, particularly a bicycle, against unauthorised access or theft is used privately, it is required for the user that the effort of entering a code and to conduct the opening process and the closing process is reduced and can be facilitated in a quick manner. For many users it is required to have at least a feeling about exclusive and direct control of the lock, particularly to experience the same user experience when using a conventional mechanical lock which is operated with a key. In addition to that many users get the impression that a potential security risk may exist and that their actions are monitored if a service centre is interposed for the opening process or the closing process of the lock.

SUMMARY

In the light of that, the present invention has the object to provide a solution for protection for a means of transportation, particularly a bicycle, against unauthorised usage or theft, particularly for private use, thereby avoiding the aforesaid disadvantages. For the technical solution the present invention proposes a method to protect a means of transportation, particularly a bicycle, against unauthorised usage or theft using a lock and an end device which can be operated in a cellular network, comprising the following steps:

a) Receipt of data by the lock via the cellular network using a communication module of the lock, wherein the data is addressed to the lock using address information which is assigned to the communication module, and wherein the data comprises an address information of an end device and the key information which is stored on the end device;

b) Evaluation of data received by the communication module with a computing device, wherein the computing device, preferably a comparison unit of the computing device, compares the key information of the received data with the key information that is stored in the storage means of the lock;

c) Execution of a control command in case the key information which has been compared to each other by the computing device matches;

d) Creation of a new key information by the computing device, preferably with a generation unit of the computing device;

e) Storage of the newly created key information in the storage means of the lock;

f) Transmission of the newly created key information from the communication module to the end device via the cellular network using the address information of the end device;

g) Storage of the new key information on the end device; and h) Actuation of the lock based on the control command via an electromechanical means for closing respectively opening the lock.

The present invention is based on the finding that when using a communication module provided to a lock which is usable in a cellular network for sending and/or receiving data via the cellular network and a computing device provided to a lock for evaluation, execution and coordination of opening processes respectively closing processes of the lock, wherein the coordination particularly comprises the secure creation and exchange of key information, the interposition of a service centre can be left out. The omission of the service centre for opening processes and closing processes of the lock eliminates the disadvantages associated with that which have been described before. Particularly the user gets the experience of an exclusive and secure control over the lock.

An advantageous embodiment of the invention provides that the data which send by the communication module of the lock is encrypted and/or the data received by the end device is encrypted, particularly by means of a range of dispersion function, preferably by means of a hash function, more preferably by means of a cryptographic hash function, or the like function or algorithm, to further enhance the security of the inventive solution particularly against manipulations or disturbances. Advantageously the data received by the end device is encrypted using the key information and data received by the communication module is decrypted by the computing device using the key information.

According to further advantageous embodiment of the invention it is provided that during the evaluation in process step b) of the inventive method the computing device of the lock, preferably the comparison unit of the computing device, compares the address information of the received data with the address information held in the storage means of the lock, wherein in case of a match of the address information compared to each other the inventive method continues with process step c). Due to the inventively planned comparison of address information from the sender of received data with address information held in a storage means of the lock the security of the inventive solution is further enhanced, because not only key information is compared to each other, but also address information. The address information which is captured in the storage means of the lock can be stored by the user of the lock, particularly during an initial operation respectively configuration of the lock. Advantageously the user of the lock can send a message with his end device using an address information which is assigned to the communication module of the lock by the cellular network, preferably an SMS (SMS: short message service), which contains the address information assigned to the end device of the user by the cellular network. The address information allocated to the communication module of the lock by the cellular network is received by the user for example when purchasing the lock or advantageously from a device that has to be contacted during initial configuration of the lock, preferably via the cellular network.

To further enhance the security the address information of the communication module of the lock which is stored in the storage means of the lock is protectable by a write protection. Advantageously the write protection can only be removed by a device which has to be contacted to remove the write protection of the lock. Advantageously this device is the device for initial configuration of the lock.

A further advantageous embodiment is characterised in that in the context of storage according to process step e) of the inventive method the storage means overwrites a previously held key information with the newly created key information. In this way an improvement regarding the reliable and secure operation of the lock is achieved, particularly regarding the opening process respectively the closing process, as the lock and the end device, which is in the state after process step f) of the inventive method, preferably only provide the required latest key information for the next operation of the lock to open respectively close it.

According to a further advantageous embodiment of the invention it is provided that the data which is received with the communication module of the lock in process step a) of the inventive method further comprise a control information, and that the control command which has to be executed in process step c) of the inventive method is created by the computing device out of the control information. According to the invention it is possible for the user to determine, how the lock shall be controlled, which means particularly if the lock shall be closed or opened. Moreover further functionalities of the lock are preferably controllable via corresponding control commands, for example status requests of the lock or alarms.

A further advantageous embodiment of the invention is characterised in that a capturing of a status information by a device of the lock is done and that the status information is sent via the cellular network to the end device, preferably during the sending according to process step f) of the inventive method. Preferably the status information comprises an information of a device for determination of the geographical location of the lock, an information of a device for the detection of movements of the lock and/or an information of a device for monitoring a manipulation of the lock. A manipulation of the lock according to the present invention comprises for example the opening or damaging of the housing of the lock, a cut-through of the locking bolt of the lock, or the like manipulations. With this kind of information as part of the control information according to the invention more advantageous applications can be realised, particularly the determination of the location of the lock and thereby the location of the means of transportation which is preferably tightly connected to the lock, an alarm triggering when the lock is moved and/or manipulated, as well as a usage protocol regarding the locations of the lock, usage times of the lock or the like.

A further advantageous embodiment of the invention is characterised in that the storage means of the lock additionally comprises information, particularly information regarding an IMEI (IMEI: International Mobile Equipment Identity) and/or an IMSI (IMSI: International Mobile Subscriber Identity) and/or a TMSI (TMSI: Temporary Mobile Subscriber Identity) of the end device. The security can be further enhanced considering respectively using this additional information, particularly as further paired information is compared to each other and thus an extensive plausibility check can be realised. An advantageous embodiment of the invention provides that during the evaluation according to process step b) of the inventive method the computing device, preferably the comparison unit of the computing device, compares the additional information of the received data which has been received by the communication module of the lock with the existing additional information in the storage means, wherein in case of a match of the additional information compared to each other the inventive method is continued with process step c). For the technical solution of the above mentioned object a lock for protection for a means of transportation, particularly a bicycle, against unauthorised usage or theft, is further proposed, comprising:

a communication module that can be operated in a cellular network;

a storage means;

an electromechanical means for closing respectively opening the lock; and a computing device;

wherein:

an address information is assigned to the communication module and data is receivable via the cellular network and transmittable to an address information;

the storage means holds a key information and is designed to store a created key information;

the electromechanical means for closing respectively opening is designed to operate the lock based on a control command; and the computing device is designed to compare the data received by the communication module which contains an address information and a key information with the key information held in the storage means, and in case of a match of the compared key information to execute a control command and to create a new key information which is transmittable to the address information via the communication module.

Advantageously the data which is transmittable from the communication module can be encrypted, particularly with a range of dispersion function, preferably with a hash function, more preferably with a cryptographic hash function, or the like function or algorithm, to increase the security of the inventive lock particularly against manipulations or disturbances.

A further advantageous embodiment of the invention provides that the comparison of address information of received data with address information held in the storage means can be done by the computing device, and in case of a match of the address information compared to each other a control command can be executed by the computing device. The inventive comparison of address information of the sender of the received data with captured address information previously stored in the storage means of the lock further increases the security of the inventive solution, as not only key information is compared to each other, but also address information. The address information held in the storage means of the lock can particularly be stored during an initial operation respectively configuration of the lock by the user. Advantageously the user of the lock can send a message with his end device using an address information which is assigned to the communication module of the lock by the cellular network, preferably an SMS (SMS: short message service), which contains the address information assigned to the end device of the user by the cellular network. The address information assigned to the communication module of the lock by the cellular network is received by the user for example when purchasing the lock or from a device that has advantageously only to be contacted during initial configuration of the lock, preferably over the cellular network.

Advantageously the address information stored in the storage means can be protected by a write protection, particularly to further increase the security of the inventive solution. A preferred embodiment of the invention is characterised in that the communication module and/or the address information associated with the end device is an MSISDN (MSISDN: Mobile Subscriber ISDN Number; ISDN: Integrated Services Digital Network).

Advantageously the key information which is held in the storage means of the lock can be overwritten with the new key information. With that an improvement regarding a more reliable and secure operation of the lock can be achieved, particularly regarding the opening process and the closing process, as the lock and the end device, the latter after process step f) of the inventive method, preferably only provide the latest key information for the next operation process of the lock for opening respectively closing the same.

A further advantageous embodiment of the invention is characterised in that the lock comprises a device for determination of the geographical location of the lock, preferably a GPS module (GPS: Global Positioning System), a device for detecting movements of the lock and/or a device for monitoring a manipulation of the lock. With such devices further information can be obtained and used for example for the generation of control commands, particularly to realise further advantageous applications, for example the determination of the location of the lock and with that the location of the means of transportation which is preferably tightly connected with the lock, an alarm triggering when the lock is moved and/or manipulated, as well as a usage protocol regarding locations of the lock, usage times of the lock and the like. Preferably it is possible with the device for determination of the geographical location of the lock, with the device for detection of movements of the lock/or with the device for monitoring a manipulation of the lock to create control information which can be converted to an executable control command and/or a status information.

According to further advantages embodiment of the invention the lock comprises an energy supply unit, preferably an accumulator, wherein the energy supply unit preferably is chargeable via a dynamo and/or a solar unit. In case the means of transportation which has to be protected is a bicycle, the dynamo can preferably be arranged in the bottom bracket of the bicycle or can be part of the same. A further advantageous embodiment of the invention provides that the electromechanical means for closing respectively opening the lock works together with the bottom bracket of the bicycle such that the bottom bracket of the bicycle is locked when the lock is in a closed state. Alternative and/or additional embodiments of the invention provide that the rod and/or the gear of the means of transportation is blocked. The blocking can be carried out mechanically, electrically or electromagnetically, for what means are provided preferably at the means of transportation which work together with the electromechanical means for closing respectively opening the lock.

Advantageously the inventive lock is designed to carry out the process steps which have to be carried out by the lock according to the inventive method.

Object of the present invention is further an end device for protection of a means of transportation against unauthorised usage or theft, wherein the end device is designed for an operation in a cellular network, and an address information is assigned to the end device and data, which comprises an address information of the end device and a key information, is transmittable via the cellular network to an address information that is assigned to an inventive lock, and data which contains a new key information is receivable via the cellular network.

Advantageously the data sent from the end device can be encrypted, particularly by means of a range of dispersion function, preferably by means of a hash function, more preferably by means of cryptographic hash function, or the like function or algorithm, to further increase security.

Advantageously the data sent from the end device can be encrypted using the key information.

A further preferred embodiment of the invention provides that the address information of the end device is an MSISDN.

According to further proposal of the invention the data which can be sent from the end device via the cellular network comprises a control information that can be converted to a control command by the inventive lock and/or additional information.

Advantageously the data which can be received by the end device via the cellular network comprises status information of the inventive lock.

Advantageously the inventive end device is designed to carry out process steps of the inventive method that have to be executed by the end device.

Further details, features and advantages of the invention will be explained in more detail with reference to the exemplary embodiments illustrated in the figures of the drawing.

DETAILED DESCRIPTION

To protect a means of transportation, in this case a bicycle, against unauthorised usage or theft by means of a lock B and an end device of a user A which can be operated in a cellular network, the lock B comprises a communication module that can be operated in the cellular network, enabling the lock B be to receive or send data via the cellular network. The present cellular network is a network according to the GSM-, GPRS-, UMTS-, and/or LTE-radio network standard.

To access the cellular network the communication module of the lock B uses a mobile subscriber identification module, also called SIM (SIM: Subscriber Identity Module). A unique address information is assigned to the communication module of the lock B via the mobile subscriber identification module by the cellular network, in this case the number MSISDN2 which is used to address respectively to reach the mobile subscriber identification module of the communication module of the lock B via the cellular network. The lock B further comprises a storage means, which holds a key information TC. The key information TC is provided by the manufacturer of the lock and is communicated to the user A when purchasing the lock B. To increase the security a range dispersion function, for example a so-called hash, is used to provide an encrypted key information. This is done by creating the hash of lock B with an algorithm using the key information TC and the address information MSISDN2 of the lock B. The hash B is stored by the storage means of the lock B as well and communicated to the user A when purchasing the lock B.

The present end device of user A is a mobile end device A which can be operated in the cellular network. To access the cellular network the end device A of the user A uses a mobile subscriber identification module, also called SIM (SIM: Subscriber Identity Module). A unique address information is assigned to the end device by the cellular network using the mobile subscriber identification module, at present the number MSISDN1 which is used to address respectively to reach the end device via the cellular network. The end device A or its mobile subscriber identification module further comprise a storage means, in which a key information TC' is stored that can be defined by the user. To increase the security a range of dispersion function is further used, for example a so-called hash which provides an encrypted key information TC'. For this purpose the hash of the end device A is created by an algorithm using the key information TC' and the address information MSISDN1 of the end device A. The hash A is also stored by the storage means of the end device A, respectively by its mobile subscriber identification module.

Figure 1:
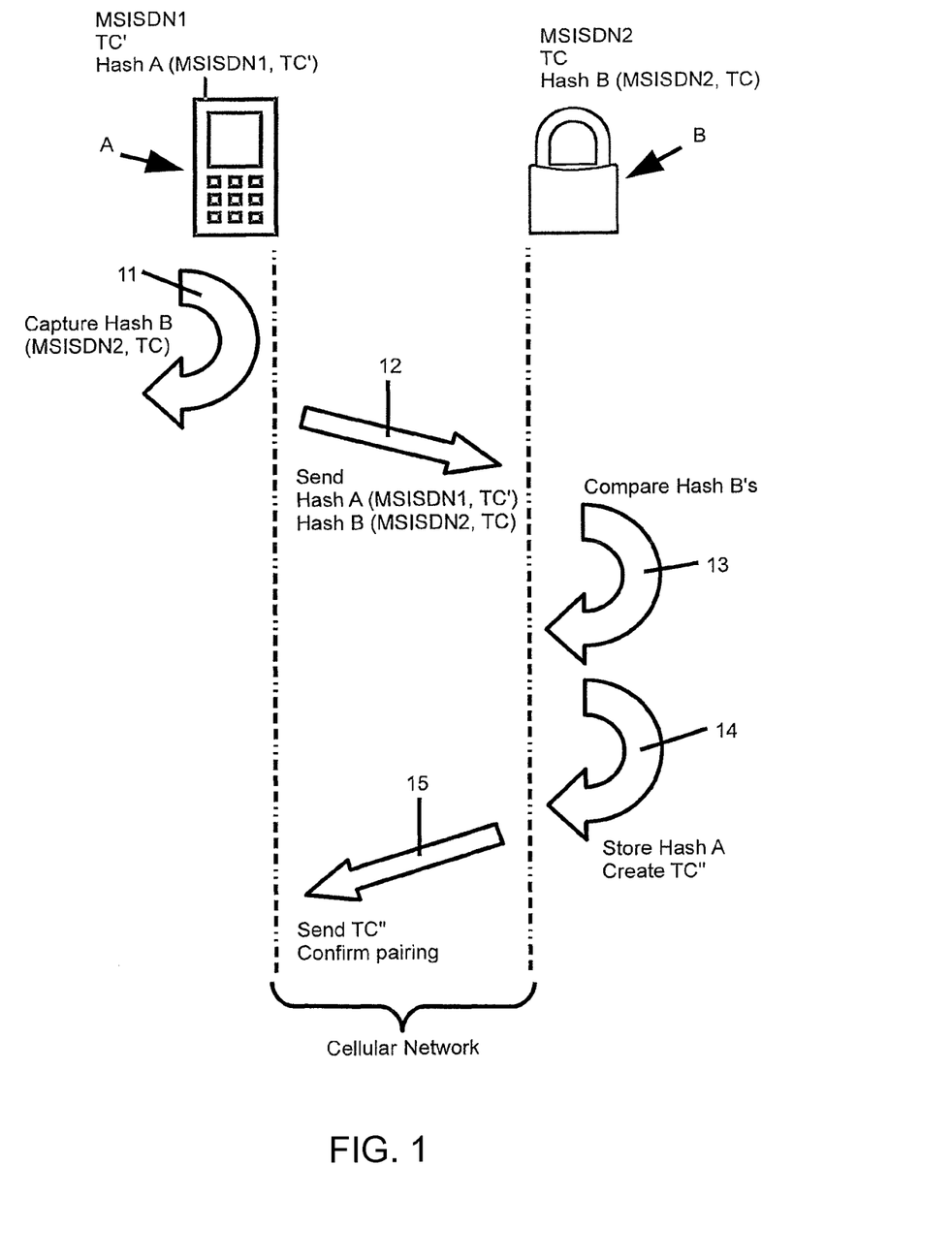
FIG. 1 shows a basic embodiment for an initial configuration of the inventive lock and an inventive end device for protection of a means of transportation against unauthorised usage or theft using a flow chart.

As illustrated in FIG. 1 the user captures the hash B which is created using the MSISDN2 and the key information TC of the lock with his end device for an initial configuration of the lock and the end device, the so-called pairing (see process step in FIG. 1 that is marked with reference sign 11). The capturing of hash B by the end device A of user A can be done by manual input or using a two-dimensional code, particularly a so-called QR-code (QR: Quick Response), by means of a camera of the end device A. For this hash B of the lock B is communicated respectively provided to the user A as a QR-code.

Subsequently the end device A sends the hash A which has been created using the MSISDN1 and the key information TC' of the user A and the hash B which has been created using the MSISDN2 and the key information TC of the lock B via the cellular network to lock B using the address information MSISDN2 of lock B (see process step in FIG. 1 that is marked with reference sign 12). The hash B which is received from the end device A is compared by lock B with the hash B that is stored by the lock (see process step in FIG. 1 that is marked with reference sign 13). In case of a match of received hash B with the stored hash B, the hash A is stored by the lock B (see process step in FIG. 1 that is marked with reference sign 14). Furthermore the new key information TC" is created by lock B (see process step in FIG. 1 that is marked with reference sign 14) which is sent to end device A via the cellular network (see process step in FIG. 1 that is marked with reference sign 15). By sending the new key information TC" from the lock B to end device A, the lock further sends an information respectively a message to the end device A, which informs the user about the successful pairing of end device A with lock B (see process step in FIG. 1 that is marked with reference sign 15).

The new key information TC" which is received by the end device A is further used by end device A to encrypt control information which can be converted to control commands by lock B and which is send by the user A of end device A from end device A to lock B via the cellular network. As lock B knows the key information TC", the lock B can decrypt the received control information from end device A which has been encrypted with key information TC" by end device A.

Figure 2:
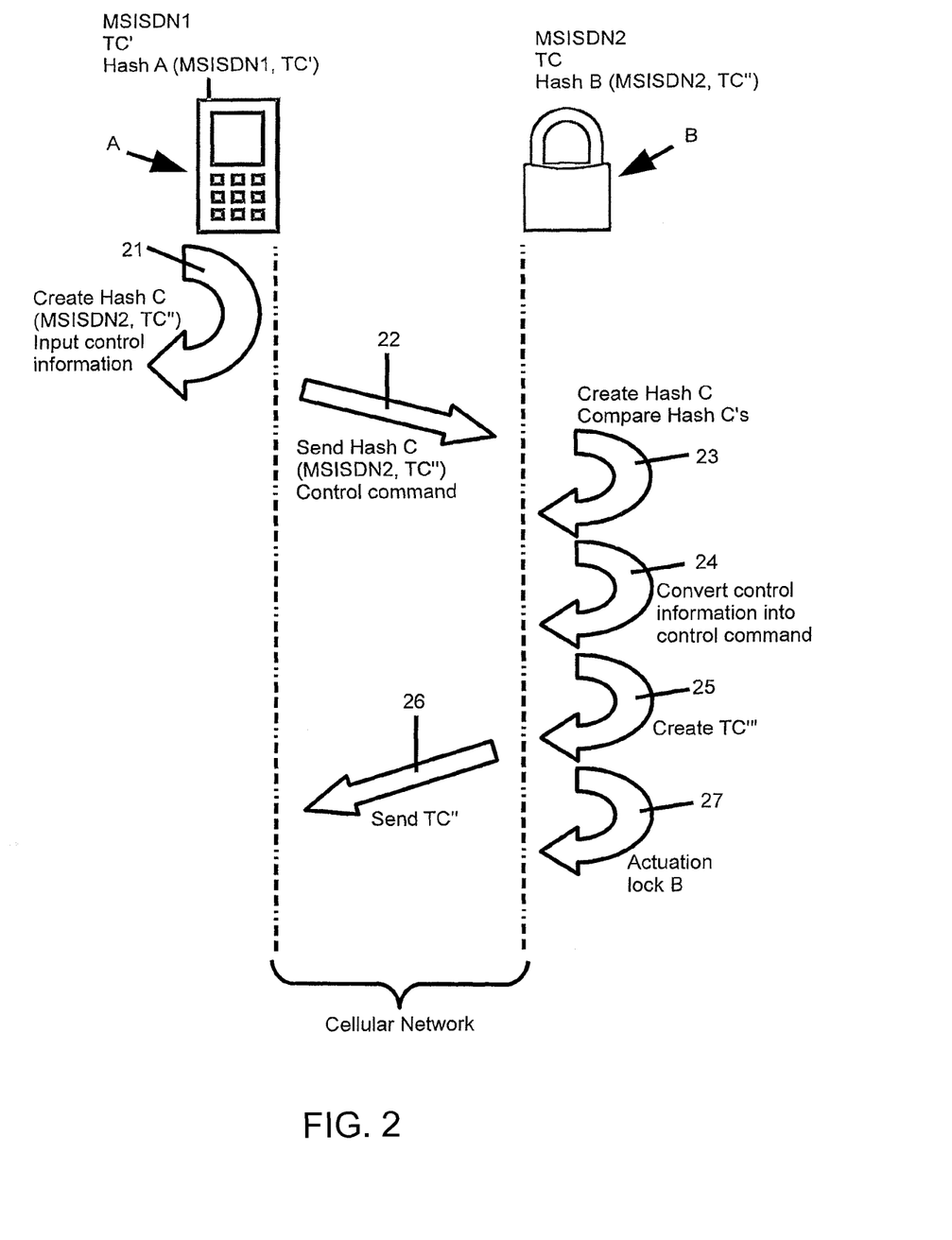
FIG. 2 shows a basic embodiment for an inventive method for protection of a means of transportation against unauthorised usage or theft using a flow chart.

FIG. 2 shows a preferred embodiment for the potential use of the lock B to secure a means of transportation against unauthorised usage or theft after pairing of lock B with end device A according to FIG. 1.

To open respectively to close the lock B the user of the end device A sends a hash C which has been created using MSISDN2 of the lock B and the key information TC" which has been received from the lock B (see process step in FIG. 2 that is marked with reference sign 21) and a control information that can be converted to a control command by lock B using the address information MSISDN2 of the lock B via the cellular network to lock B (see process step in FIG. 2 that is marked with reference sign 22).

The data which is received by the communication module of lock B and which has been sent to the lock B in the process step that is marked with reference sign 22 is evaluated by the computing device of lock B (see process step in FIG. 2 that is marked with reference sign 23). In doing so a comparison unit of the computing device of lock B compares the received hash C which has been created using the MSISDN2 and the key information TC" with a hash C, that has been created by the lock B using its own MSISDN2 and the key information TC", which is stored in the storage means of lock B. In case hash C which was received by lock B from the end device A matches with the hash C that is defined and stored by lock B, the computing device of the lock B converts the control information received in the FIG. 2 process step that is marked with reference sign 22 into and electoral mechanical means for closing respectively opening the lock B (see process step in FIG. 2 that is marked with reference sign 24). Furthermore the computing device of lock B creates a new key information TC'" using a generator unit of the computing device of lock B, which is stored by the storage means of the lock (see process step in FIG. 2 that is marked with reference sign 25). After that the stored key information TC'" is sent in the FIG. 2 process step that is marked with reference sign 26 from the lock B to the end device A via the cellular network using the address information MSISDN1 of end device A by means of the communication module of lock B. Subsequently the computing unit of lock B triggers an execution of the control command that has been converted from the received control information in the FIG. 2 process step that is marked with reference sign 24, which results in an actuation according to the control information respectively the control command of the electromechanical means for closing respectively opening the lock B (see process step in FIG. 2 that is marked with reference sign 27).

With the new key information TC''' that is sent from lock B to end device A in the FIG. 2 process step that is marked with reference sign 26 (see process step in FIG. 2 that is marked with reference sign 26) a subsequent actuation of the lock B by means of end device A is possible, wherein the key information TC'' from process step 21 (see process step in FIG. 2 that is marked with reference sign 21) is then the key information TC' that is used to repeat the method according to those process steps marked with reference signs 21 to 27 in FIG. 2.

If further sensoric- and/or actoric-elements are present at lock B, particularly for a device or a unit to determine the geographical location of the lock B, preferably by means of a GPS module, a device for detection of movements of lock B and/or a device for monitoring of a manipulation of lock B, the control information sent from end device A to lock B in process step 22, which is converted to a control command by lock B, can also or additionally comprise information that contains data about the status of lock B regarding sensoric- and/or actoric-elements, for example information that is used by the lock B to request status information of the sensoric- and/or actoric-elements and their transmission to the end device. In addition to that even more control information and/or status information can be sent from end device A to lock B via the cellular network in process step 2 according FIG. 2, for example for determination of the location of lock B, for triggering an alarm, particularly if an alarm annunciator is present at lock B, or the like information.

Figure 3:
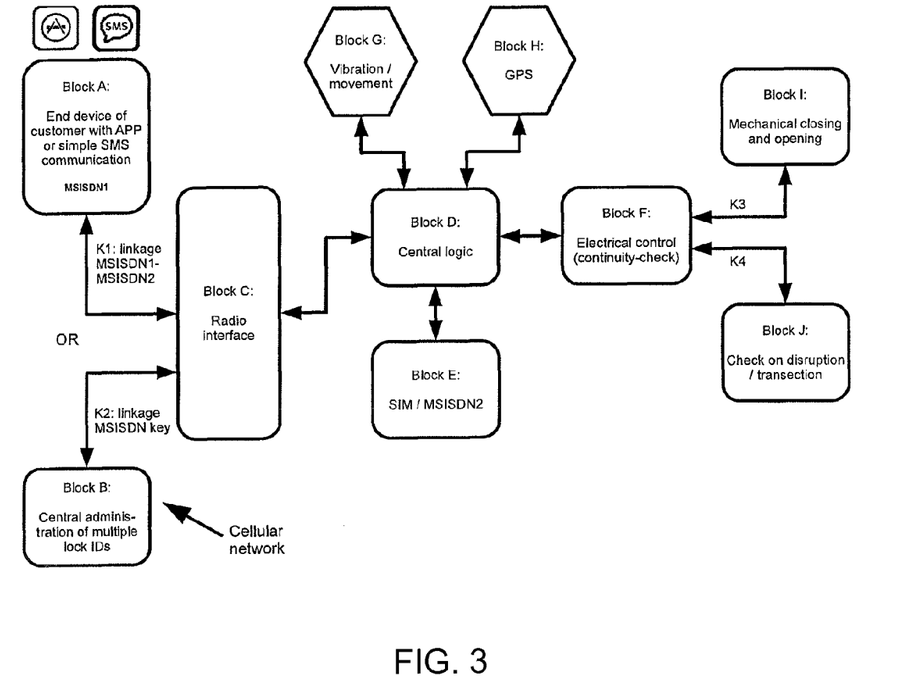
FIG. 3 shows a basic embodiment of the construction and mode of operation of an inventive lock using a block diagram.

The block diagram in FIG. 3 shows a further preferred embodiment for a lock for protection of a means of transportation against unauthorised usage or theft.

The lock comprises a communication module that can be operated in a cellular network (block C: radio interface), which is using a mobile subscriber identification module assigned to lock B to access the cellular network (block E: SIM/MSISDN2), and a computing device (block D: central logic) with a control unit for sensoric- and/or actoric-elements of lock B (block F: electrical control (continuity check)), present for an electromechanical means for closing respectively opening the lock (block I: mechanical closing and opening) and the device for monitoring a manipulation of the lock B (block J: check on disruption/transection). The lock B further comprises a device for determination of the geographical location of the lock B, at present a GPS module (block H: GPS), as well as a device for detection of movements and/or vibrations of the lock B (block G: vibration/movement). The storage means of lock B are not displayed separately in FIG. 3.

The end device A of user A is marked as block A in FIG. 3 (block A: end device of the customer with an application or simple SMS communication MSISDN1).

If the lock shall be usable by multiple users, end devices or shall be operated with multiple different end devices in a preferred embodiment, preferably a central resource for administration of those is provided (block B: central administration for multiple lock IDs).

The operating procedure of the lock B is described in more detail referring to the block diagram:

For initial configuration respectively pairing of lock B with the end device A a linkage of the MSISDN1/IMSI1 of end device A from block A to block C, block D and block E with MSISDN2/IMSI2 of lock B is done via the cellular network.

For that block A, referring to the end device of the owner respectively the user of the lock, acts as an electronic key to open respectively to close lock B as well as for the retrieval of status notifications and/or alarm notifications.

For all logons and logoffs from block A at block D the MSISDN of block E, meaning the MSISDN2, and a further random key respectively code that is created during production of the lock B is required. The MSISDN2 and the created key are separately communicated to the owner respectively the user of the lock B when purchasing the lock B, for example by means of an information field in the operating manual protected against inspection by a scratch ticket or the like.

Block A can now logon respectively authenticate at block D with knowledge of the MSISDN2 (block E) and the key respectively the code as a future key via the cellular network. For that block A sends the command "logon" in conjunction with the hash from MSISDN2 and the key respectively code via the cellular network (marked in FIG. 3 with the arrow labeled with reference sign K1) and block C to block D. Block D also calculates the hash from the key respectively the code and its own MSISDN2. If the hash matches with the transmitted hash, block D of the lock will accept the controls from block A/MSISDN1 from now on and send information or alarms to the MSISDN1.

A closing respectively opening of the lock B is given as follows: For closing the block A sends the command "close" (wherein the command can be represented with an identifier) in conjunction with a hash from the MSISDN2 and the key respectively code via the cellular network (marked in FIG. 3 with the arrow labeled with reference sign K1) and block C to block D. Block D also calculates the hash from the key respectively the code and its own MSISDN2. If the hash matches with the transmitted hash, block I closes via block F and activates the blocks G, H and J.

For opening the block A sends the command "open" (wherein the command can be represented with an identifier) in conjunction with a hash from the MSISDN2 and the key respectively code via the cellular network (marked in FIG. 3 with the arrow labeled with reference sign K1) and block C to block D. Block D also calculates the hash from the key respectively the code and its own MSISDN2. If the hash matches with the transmitted hash, block I opens via block F and deactivates the blocks G, H and J.

Further control commands are designed in the same scheme for activation or deactivation of the functions of block G, block H, block I and Block J:

For activation of a function the block A sends the command "activate function X" (wherein the command can be represented with an identifier) in conjunction with a hash from the MSISDN2 and the key respectively code via the cellular network (marked in FIG. 3 with the arrow labeled with reference sign K1) and block C to block D. Block D also calculates the hash from the key respectively the code and its own MSISDN2. If the hash matches with the transmitted hash, the command "activate function X" is sent from block D via blocks G, H and J are activated.

For deactivation of a function the block A sends the command "deactivate function X" (wherein the command can be represented with an identifier) in conjunction with a hash from the MSISDN2 and the key respectively code via the cellular network (marked in FIG. 3 with the arrow labeled with reference sign K1) and block C to block D. Block D also calculates the hash from the key respectively the code and its own MSISDN2. If the hash matches with the transmitted hash, the command "deactivate function X" is sent from block D via blocks G, H and J are deactivated.

For the monitoring respectively the request of status information of functions at least one of the functions according to the blocks G, H, I or J of the lock B has to be activated.

If the state of a block G, H, I or J changes, the information about this change is transmitted as an alarm respectively as an alarm message via block C of the lock B and the cellular network (marked in FIG. 3 with the arrow labeled with reference sign K1) to block A. For that block D sends a datagram and a trigger reason with all available information to block A. The content of the datagram and the trigger reason thereby reflect the status of block G, the status of block H, the status of block I and/or the status of block J. The status can comprise information about the lock B in general, the status of a power supply of lock B, status error message of lock B or the like. In dependency of the type of monitoring selected by the user of end device A the datagram is sent after an alarm is triggered, preferably periodically in a defined time interval, or only if the information of one of the senros of the block G, H, I or J has changed again, for example if the means of transportation provided with the lock is moved or the like.

The communication marked with reference sign K1 in FIG. 3 between the end device A and the lock B using the MSISDN1 of end device A and MSISDN2 of lock B takes place by means of SMS in the simplest case. The communication between end device A and the MSISDN2 of lock B can also take place using other protocols of cellular networks. The input of control commands on the part of block A and the evaluation respectively the readout of the datagrams can preferably be supported by an application running on the end device A, a so-called app. In doing so a closing respectively opening of the lock could happen if the location of the user of the end device A matches the location of the lock B does or does not match, or it could happen via an SMS as a manual action performed by the user of end device A.

Block B of the lock B depicted in FIG. 3 represents a platform for administration of inventive locks. The communication between the end device respectively the end devices and the lock respectively the locks does not change when block B is existing. Block B does particularly enable a parallel administration of lock groups.

Block D of the lock B depicted in FIG. 3 of the lock B administers the connected sensors abd the communication with block A and/or block B and monitors the sensors and their resulting alarming behaviour. Thereby the logic of block D analyses the values reported by the sensors. If the values exceed a pre-defined or particularly a threshold set by the user, an alarm is triggered.

Block F of the lock B depicted in FIG. 3 fulfills two functions. It monitors the lock regarding a transection respectively regarding a violent opening. It further opens the lock B upon command or closes it again.

Block G of the lock B depicted in FIG. 3 reflects a vibration—respectively a movement-sensor. The vibration—respectively movement-sensor is preferably such configurable that a slight vibration at the lock B does not lead to an alarm, wherein a stronger vibration does lead to an alarm. This threshold is advantageously adjustable respectively definable by the user.

Block H of the lock B depicted in FIG. 3 reflect a GPS module of the lock. Advantageously the GPS module enables a monitoring of a changing location of the lock B in a certain area, which can particularly be defined by the user of the end device A, a so-called geo-fencing.

Block I of the lock B depicted in FIG. 3 comprises the electromechanical means for closing respectively opening the lock B.

Block J of the lock B depicted in FIG. 3 takes over the check on disruption respectively transection of the lock B respectively its housing.

The preferred embodiments shown in the figures of the drawing of the invention and the preferred embodiments described in conjunction with those are merely illustrative and are not limitative for the invention.

REFERENCE SIGNS

A User respectively end device of the user
B Lock
MSISDN1 Address information (end device A)
MSISDN2 Address information (lock B)
TC, TC', TC'', TC''' Key information
11 Process step (capture hash B (MSISDN2, TC))
12 Process step (send hash A (MSISDN1, TC') and hash B (MSISDN2, TC))
13 Process step (compare hash B (MSISDN2, TC))
14 Process step (store hash A (MSISDN1, TC) and create TC'')
15 Process step (send TC'' and confirm pairing)
21 Process step (create hash C (MSISDN2, TC''))
22 Process step (send hash C (MSISDN2, TC'') and control information
23 Process step (evaluate (compare hash B (MSISDN2, TC)))
24 Process step (convert control information)
25 Process step (create and store TC''')
26 Process step (send TC''')
27 Process step (actuation lock)

The invention claimed is:

1. A method for protection against unauthorised usage or theft of an object using a lock comprising a computing device and a radio interface, and an end device usable in a cellular network, comprising:
receiving data by the lock via the cellular network using the radio interface of the lock, wherein the data is addressed to the lock using address information which is assigned to the communication module radio interface of the lock, and wherein the data comprises address information corresponding to an end device on the cellular network and key information which represents key information stored on the end device;
comparing, by the computing device of the lock, the key information of the received data with key information previously stored in the lock;
generating, by the computing device of the lock, new key information in response to the key information of the received data matching the key information previously stored in the lock, the new key information being different than the key information previously stored in the lock;
storing, by the lock, the new key information in the lock;
transmitting, by the radio interface of the lock, the new key information to the end device via the cellular network using the address information of the end device;
receiving, by the radio interface of the lock, control information from the end device and converting the control information into a control command to mechanically lock or unlock the lock based on the new key information stored in the lock.

2. The method according to claim 1, wherein the data sent from the radio interface of the lock is encrypted and/or the data received by the end device is encrypted using a hash function.

3. The method according to claim 2, wherein the data which is received by the radio interface of the lock is decrypted by the computing device of the lock using the new key information.

4. The method according to claim 1, wherein comparing the key information of the received data with key information previously stored in the lock further comprises comparing the address information of the received data with address information previously stored in the lock, and wherein generating new key information by the lock is in response to the address information of the received data matching the address information previously stored in the lock.

5. The method according to claim 1, wherein storing the new key information further includes overwriting the previously stored key information with the new key information.

6. The method according to claim 1, wherein the received data includes control information, and wherein generating new key information is based on transforming the control information into a control command.

7. The method according to claim 1, further comprising:
generating, by the computing device of the lock, status information based on data from a sensor of the lock; and
transmitting, by the radio interface of the lock, the status information to the end device via the cellular network.

8. The method according to claim 7, wherein the status information comprises a geographical location of the lock, and/or an indication of detected movement of the lock.

9. The method according to claim 1, wherein the address information comprises at least one of an International Mobile Equipment Identity (IMEI), an International Mobile Subscriber Identity (IMSI), and/or a Temporary Mobile Subscriber Identity (TMSI) for the end device.

10. A lock device comprising:
a radio interface configured to communicatively couple to a cellular network, the radio interface having an associated identifier to identify the radio interface within the cellular network based on assigned address information;
a storage device;
an electromechanical lock; and
a computing device coupled to the radio interface, the storage device, and the electromechanical lock configured to:
receive data via the cellular network from the radio interface, wherein the received data comprises address information corresponding to an end device on the cellular network and key information which represents key information stored on the end device;
compare the key information of the received data with key information stored in the storage device;
generate new key information in response to the key information of the received data matching the key information stored in the storage device, the new key information being different than the key information stored in the storage device;
store the new key information in the storage device; and
transmit, using the radio interface, the new key information to the end device via the cellular network using the address information of the end device.

11. The lock device according to claim 10, wherein the received data is encrypted.

12. The lock device according to claim 10, wherein the computing device is further configured to compare the address information of the received data with address information stored in storage device, and wherein generating new key information is in response to the address information of the received data matching the address information stored in the lock, and the key information of the received data matching the key information stored in the storage device.

13. The lock device according to claim 10, wherein the address information assigned to radio interface comprises an International Mobile Equipment Identity (IMEI), an International Mobile Subscriber Identity (IMSI), or a Temporary Mobile Subscriber Identity (TMSI).

14. The lock device according to claim 10, wherein storing the new key information further includes overwriting the stored key information in the storage device with the new key information.

15. The lock device according to claim 10, wherein the lock comprises at least one of a sensor for determination of the geographical location of the lock, a sensor for detection of movements of the lock and/or a sensor for surveillance of a manipulation of the lock.

16. The lock device according to claim 10, wherein the lock further comprises an energy supply unit comprising a dynamo and/or solar unit.

* * * * *